(12) United States Patent
Hellmann et al.

(10) Patent No.: US 6,512,347 B1
(45) Date of Patent: Jan. 28, 2003

(54) BATTERY HAVING AN INTEGRAL COOLING SYSTEM

(75) Inventors: John Vincent Hellmann, Rochester Hills, MI (US); Jianmin Zhu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/978,901

(22) Filed: Oct. 18, 2001

(51) Int. Cl.[7] .................................................. H02J 7/00
(52) U.S. Cl. ....................................... 320/107; 429/120
(58) Field of Search ................................ 320/107, 104, 320/101; 429/26, 120

(56) References Cited

U.S. PATENT DOCUMENTS

| | | | |
|---|---|---|---|
| 4,945,010 A | * 7/1990 | Kaufman et al. | ............ 429/26 |
| 5,424,143 A | * 6/1995 | Shrim | ........................ 429/26 |
| 6,106,972 A | * 8/2000 | Kokubo et al. | ............ 429/120 |
| 6,351,382 B1 | * 2/2002 | Nakanishi et al. | .......... 361/700 |

* cited by examiner

*Primary Examiner*—Edward H. Tso
*Assistant Examiner*—Lawrence Luk
(74) *Attorney, Agent, or Firm*—Christopher DeVries

(57) ABSTRACT

A battery system including at least one battery cell having an interior and having at least one exterior surface is provided with at least one cooling plate that is positioned in engagement with the exterior surface for absorbing heat from the interior of the battery cell. A cooling tube is thermally coupled to the cooling plate for absorbing heat from the cooling plate.

21 Claims, 3 Drawing Sheets

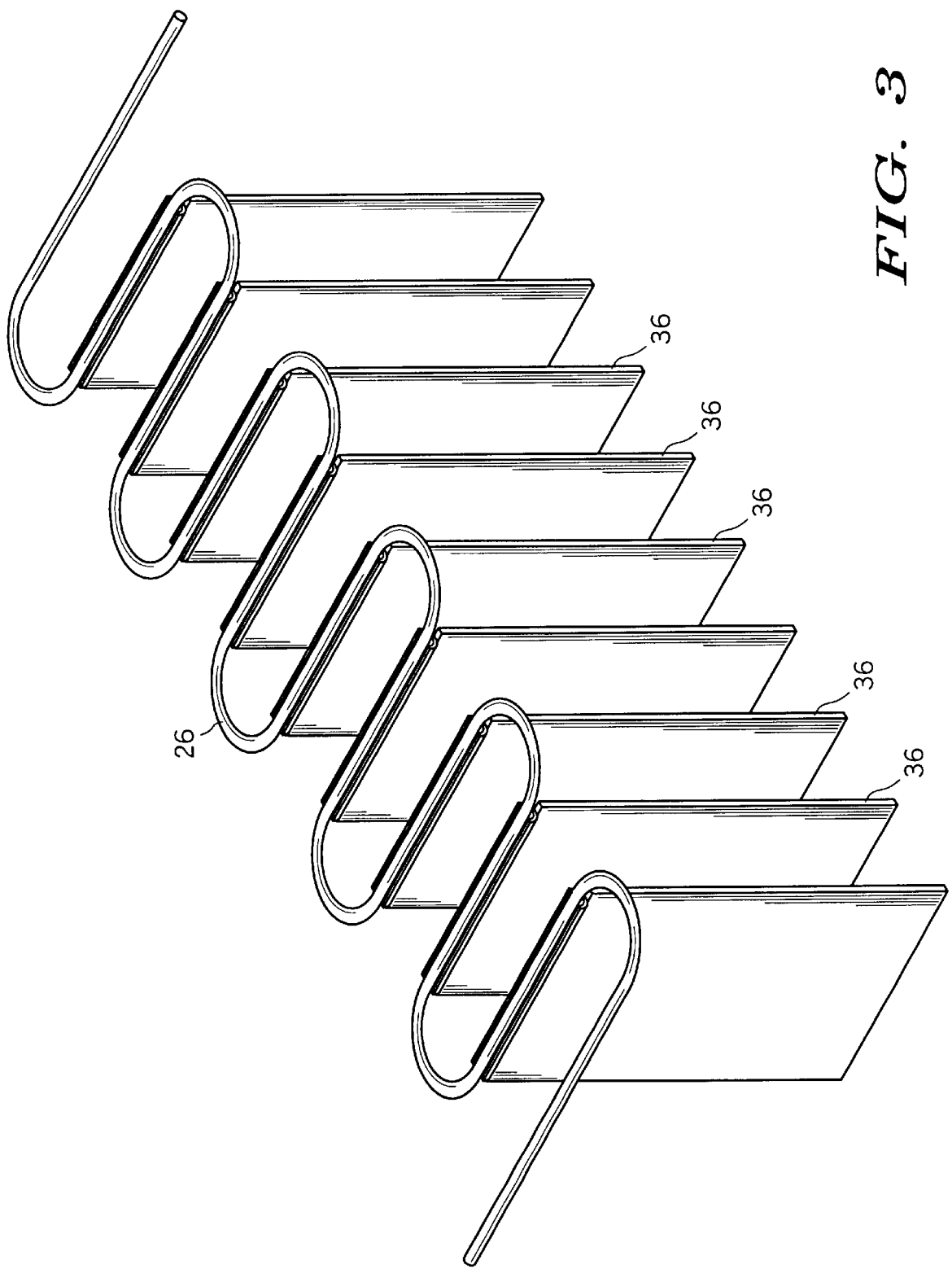

BATTERY HAVING AN INTEGRAL COOLING SYSTEM

TECHNICAL FIELD

This invention relates generally to battery systems and more particularly to a battery having an integral cooling system for use in a vehicle.

BACKGROUND OF THE INVENTION

The use of vehicles powered by internal combustion engines is common. However, it is well known that certain problems associated with the use of internal combustion engines such as fuel shortages, costs of operation, and the deleterious effect on the environment have led to the increased interest in and use of vehicles powered by electricity. Obviously, batteries must supply the electricity required for such purposes.

It is well known that heat is generated in battery cells when the battery is being used, especially when the battery is being aggressively charged or discharged. The generated heat must be removed and dissipated in order to improve battery performance and extend battery life. Traditionally, airflow systems have been employed to dissipate battery heat. However, air-cooling does not provide satisfactory thermal conduction from the interior of the battery cells. Such systems generally draw air from the operating environment, causing dirt and grime to deposit on the battery and battery terminals which could lead to inferior performance and even malfunction such as ground fault problems. Additionally, it is well known that size and weight are important considerations, and airflow battery cooling systems tend to occupy and require large amounts of space. Finally, airflow systems are generally noisy and expensive.

Liquid-cooled battery systems avoid many of the disadvantages associated with airflow battery cooling systems. They tend to be more compact in physical design, thus permitting increased battery capacity in a limited amount of space. They are less noisy, thus resulting in quieter vehicle operation. Finally, liquid-cooled (i.e., liquid thermal management) battery systems permit cleaner operation, thus resulting in fewer malfunctions, and they are less expensive. Unfortunately, known liquid thermal management systems provide only marginal thermal conduction from the interior of the battery cells to the cooling liquid.

In view of the foregoing, it should be appreciated that it would be desirable to provide a thermal management system for cooling a battery which provides superior thermal conduction away from the interior of the battery cells. Additional desirable features will become apparent to one skilled in the art from the foregoing background of the invention and the following detailed description of a preferred exemplary embodiment and appended claims.

SUMMARY OF THE INVENTION

In accordance with the teachings of the present invention, there is provided an improved battery having an integral cooling system for use in an electric vehicle. The battery comprises at least one battery cell having an interior and at least one exterior surface. At least one cooling plate engages at least one exterior surface so as to absorb heat from the interior of at least one battery cell. A cooling tube is thermally coupled to at least one cooling plate and absorbs heat therefrom.

BRIEF DESCRIPTION OF THE DRAWINGS

The present invention will hereinafter be described in conjunction with the accompanying drawings, wherein like numerals denote like elements, in which:

FIG. 3 is an isometric view of the cooling tube/plate assembly shown in FIG. 1 and FIG. 2 as it is utilized in the completed battery module. D

DESCRIPTION OF THE PREFERRED EMBODIMENT

The following detailed description of a preferred embodiment of the invention is exemplary in nature and is not intended to limit the invention or the application or use thereof.

Figure 1:
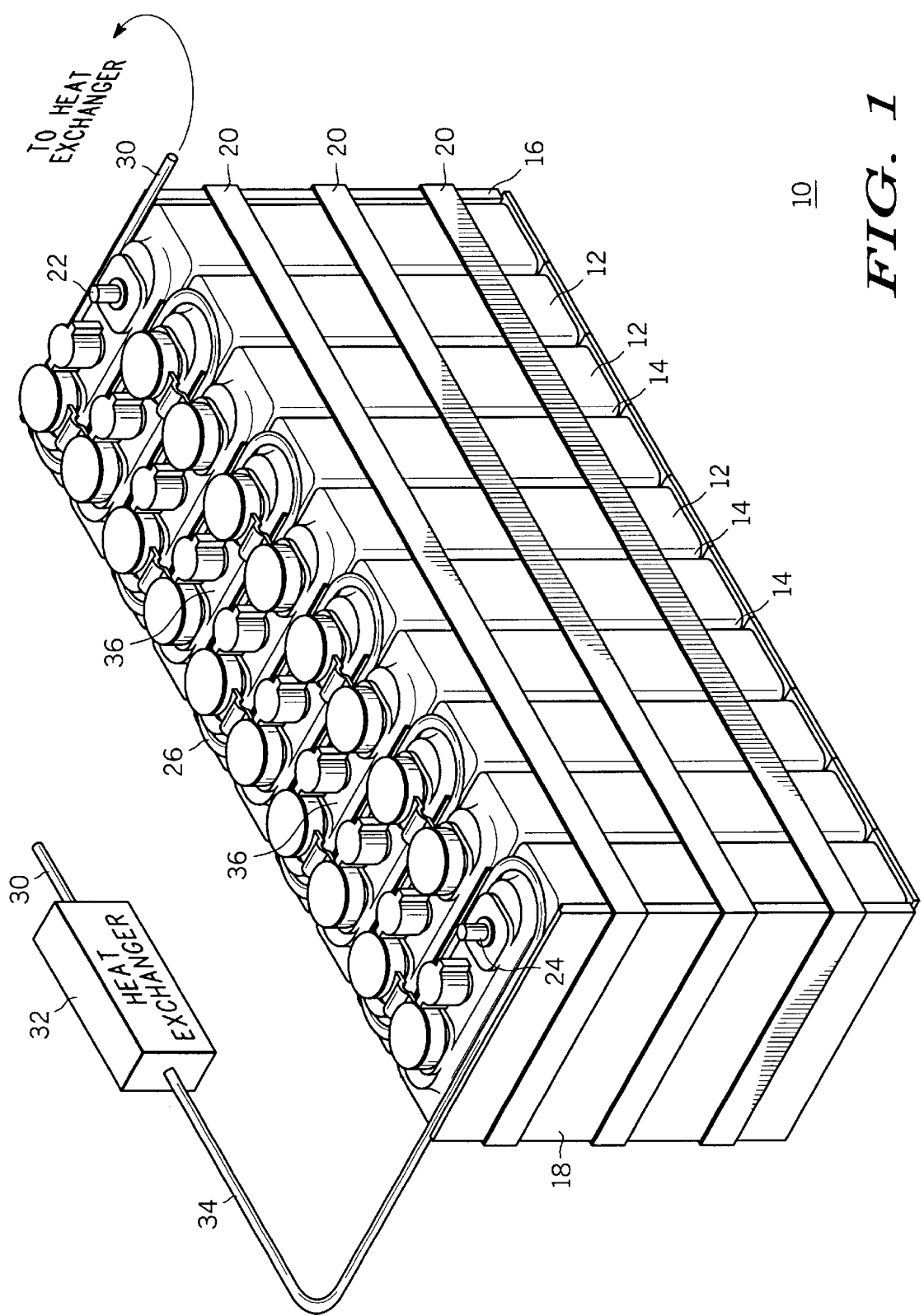
FIG. 1 is an isometric view of a fully-assembled battery module, which includes a plurality of battery cells and an integral thermal management system in accordance with the present invention.

Referring to FIG. 1, there is shown a battery system 10 including a plurality of battery cells 12. The battery cells 12 are generally rectangular in shape and are adjacent to each other at their major surfaces as is shown at 14. However, it should be clear that battery cells 12 can take other shapes. The battery cells are maintained in their relative positions by means of restraining plates 16 and 18 and a plurality of straps 20 which circumscribe the series of battery cells 12 and restraining plates 16 and 18. As can be seen, the assembled series of battery cells includes terminals 22 and 24.

At least one cooling tube 26 coils along and partially around the upper portion of each battery cell. As can be seen, the major portions of the cooling tube reside proximate the upper regions of adjacent battery cells, as is more clearly shown in FIG. 2 at 28. One end of cooling tube 26 is coupled at 30 to the input of a heat exchanger 32. The other end of cooling tube 26 is coupled to the output of heat exchanger 32 at 34.

Cooling tube 26 may be manufactured from aluminum; however, cooling tube 26 may be manufactured from any heat-conducting metal such as copper. Heat exchanger 32 may take the form of any number of well-known heat exchangers. For example, heat exchanger 32 may be a heat pump, a radiator, or a system similar to a standard vehicular air conditioning system.

Figure 2:
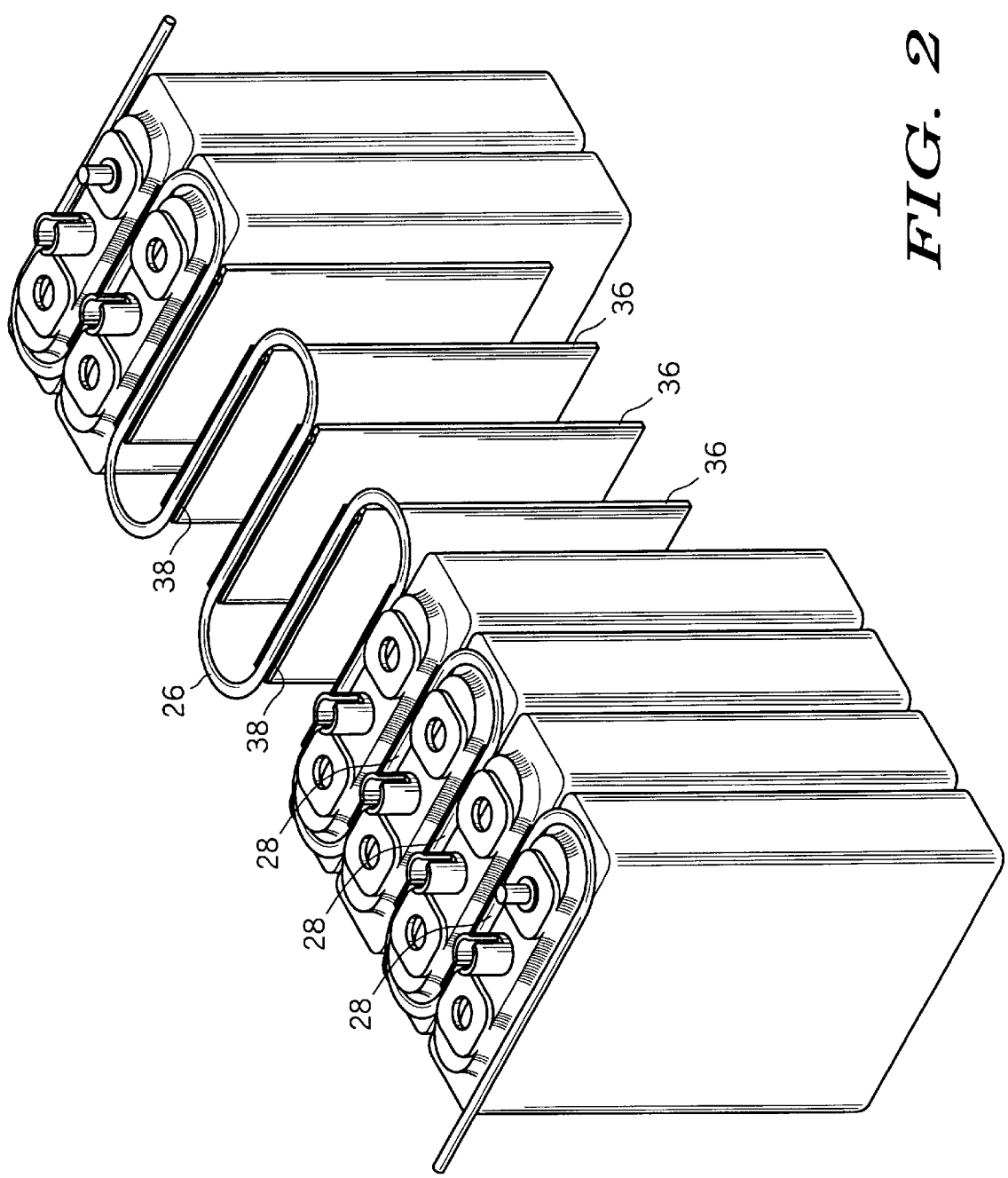
FIG. 2 is an isometric view of the battery and integral thermal management system shown in FIG. 1 with some of the battery cells removed to more clearly show a system of cooling tubes and cooling plates in accordance with the present invention.

Positioned between adjacent battery cells 12 and in contact with the major surfaces thereof are cooling plates 36, which are more clearly shown in FIG. 2. Plates 36 are likewise manufactured from any heat-conducting material such as aluminum or copper. Cooling plates 36 are thermally coupled along an upper edge thereof to cooling tube 26 as is shown at 38 by any process suitable for such purpose such as brazing.

FIG. 3 illustrates more clearly the thermally-coupled assembly of cooling tube 26 and cooling plates 36 as it is employed in the battery assembly 10 shown in FIG. 1. As stated previously, heat is generated in battery cells when the battery is being used, especially when the battery is being aggressively charged or discharged. To maintain battery performance and increase battery life, it is preferable that this heat be removed from battery cells 12. Cooling plates 36 are positioned between adjacent battery cells 12 and provide a large contact area therewith so as to form a good thermal connection close to the region of the active materials in battery cells 12. In this manner, heat is absorbed by cooling plates 36 from the interior of battery cells 12.

Cooling tube 26 is provided with cooled liquid or gas (for example, standard automobile engine coolant), which flows through cooling tube 26 at a relatively slow flow rate. Since the temperature of the coolant is less than that of cooling plates 36 as a result of cooling plates 36 extracting heat from the interior of battery cells 12, heat is transferred from cooling plates 36 to the coolant in cooling tube 26. As coolant flows through cooling tube 26 along the length of assembled battery cells 12, the temperature of the coolant increases as heat is dissipated away from the interior of the battery cells via cooling plates 36. Heated coolant is then provided at the input 30 of a heat exchanger 32 where it is cooled and provided to output 34 for recirculation through the battery assembly. It should be understood that the system of tubes and plates described could, in fact, be used to heat the battery as opposed to cooling it if for some reason that were a desired result as, for example, in extremely frigid environments.

Thus, there has been provided a battery system including an integral cooling assembly that provides for the removal of heat from an operating battery. It is simple in nature and includes a plurality of individual battery cells assembled to produce a desired voltage. It includes two electrical connections 22 and 24 and two cooling connections that could be manufactured as quick-connect couplings. The cooling tube/cooling plate assembly provides superior thermal conduction of heat from the interior of the battery cell to heat exchanger 32, and since the system does not depend on drawing air from the environment, the problems associated with contaminants and impurities in the air do not degrade performance or cause malfunctions. The inventive battery and cooling arrangement is simple and therefore can be designed to be compact and especially suitable for use in electric vehicles.

From the foregoing description it should be appreciated that there has been provided a battery having an integral cooling system which provides superior thermal heat dissipation from the interior or active regions of the battery. While the preferred exemplary embodiment has been presented in the foregoing detailed description, it should be appreciated that a vast number of variations in the embodiment exist. The above description is given by way of example only, and changes in form and detail may be made by one skilled in the art without departing from the spirit and scope of the invention as defined in the appended claims.

What is claimed is:

1. A battery system for use in an electric vehicle, comprising:
    at least one battery cell having an interior and at least one exterior surface;
    at least one cooling plate in engagement with said at least one exterior surface for absorbing heat from the interior of said at least one battery cell; and
    a cooling tube thermally coupled to said at least one cooling plate for absorbing heat from said at least one cooling plate wherein a liquid coolant flows through said cooling tube.

2. A battery system according to claim 1 wherein said at least one battery cell comprises a plurality of adjacent battery cells and wherein said at least one cooling plate comprises a plurality of cooling plates, each one of said plurality of cooling plates thermally coupled to said cooling tube and positioned between adjacent ones of said plurality of adjacent battery cells.

3. A battery system according to claim 2 wherein said cooling tube contains a coolant.

4. A battery system according to claim 3 wherein said coolant is liquid.

5. A battery system according to claim 3 wherein said coolant is gaseous.

6. A battery system according to claim 3 further comprising a heat exchanger thermally coupled to said cooling tube for altering the temperature of said coolant.

7. A battery system according to claim 6 wherein said heat exchanger is a heat pump.

8. A battery system according to claim 6 wherein said heat exchanger is a radiator.

9. A battery system according to claim 6 wherein said cooling tube is made of a heat-conducting metal.

10. A battery system according to claim 9 wherein said plurality of cooling plates is made of a heat-conducting metal.

11. A battery system according to claim 10 wherein said cooling tube and said plurality of cooling plates are made of aluminum.

12. A battery system according to claim 10 wherein cooling tube and said plurality of cooling plates are made of copper.

13. A battery system according to claim 9 wherein said plurality of cooling plates is thermally coupled to said cooling tube by brazing.

14. A liquid cooled battery assembly for use in an electric vehicle, comprising:
    a plurality of battery cells;
    a plurality of cooling plates, each one of said plurality of cooling plates positioned between adjacent ones of said plurality of battery cells for absorbing heat from said plurality of battery cells;
    at least one liquid-containing cooling tube thermally coupled to each of said plurality of cooling plates for absorbing heat from said plurality of cooling plates; and
    a heat exchanger thermally coupled to said liquid-containing cooling tube for altering the temperature of the liquid in said liquid-containing cooling tube.

15. A liquid cooled battery assembly according to claim 14 wherein said heat exchanger is a heat pump.

16. A liquid cooled battery assembly according to claim 14 wherein said heat exchanger is a radiator.

17. A liquid cooled battery assembly according to claim 14 wherein said plurality of cooling plates and said at least one liquid-containing cooling tube are made of a heat-conducting metal.

18. A liquid cooled battery assembly according to claim 17 wherein said heat-conducting metal is aluminum.

19. A liquid cooled battery assembly according to claim 17 wherein said heat-conducting metal is copper.

20. A liquid cooled battery assembly according to claim 17 wherein each of said plurality of cooling plates is thermally coupled to said at least one liquid-containing cooling tube by brazing.

21. A liquid cooled battery assembly for use in an electric vehicle, comprising:
    a vehicle body;
    a plurality of wheels coupled to said vehicle body;
    a plurality of battery cells contained in said vehicle body;
    a plurality of cooling plates, each one of said plurality of cooling plates positioned between adjacent ones of said plurality of battery cells for absorbing heat from said plurality of battery cells;
    at least one liquid-containing cooling tube thermally coupled to each of said plurality of cooling plates for absorbing heat from said plurality of cooling plates;
    a heat exchanger thermally coupled to said liquid-containing cooling tube for altering the temperature of the liquid in said liquid-containing cooling tube; and
    at least one electric motor propelling said plurality of wheels.

* * * * *